US006006110A

United States Patent [19]
Raleigh

[11] Patent Number: 6,006,110
[45] Date of Patent: *Dec. 21, 1999

[54] WIRELESS COMMUNICATION NETWORK USING TIME-VARYING VECTOR CHANNEL EQUALIZATION FOR ADAPTIVE SPATIAL EQUALIZATION

[75] Inventor: Gregory G. Raleigh, El Granada, Calif.

[73] Assignee: Cisco Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/735,066

[22] Filed: Oct. 18, 1996

Related U.S. Application Data

[63] Continuation-in-part of application No. 08/491,044, Jun. 16, 1995, which is a continuation-in-part of application No. 08/394,652, Feb. 22, 1995, abandoned
[60] Provisional application No. 60/005,647, Oct. 19, 1995.

[51] Int. Cl.$^6$ ..................................................... H04Q 7/30
[52] U.S. Cl. ........................... 455/561; 455/456; 455/65; 455/276.1; 342/367; 375/232
[58] Field of Search ..................................... 455/422, 450, 455/456, 517, 524, 525, 62, 63, 65, 67.1, 226.1, 272, 273, 276.1, 561, 560; 342/350, 367, 368, 372, 373, 378; 395/51; 375/316, 347, 349, 230, 232

[56] References Cited

U.S. PATENT DOCUMENTS

| | | | |
|---|---|---|---|
| 5,132,694 | 7/1992 | Sreenivas | 342/373 |
| 5,260,968 | 11/1993 | Gardner et al. | 375/1 |
| 5,274,844 | 12/1993 | Harrison et al. | 455/25 |
| 5,386,589 | 1/1995 | Kanai | 455/33.1 |
| 5,412,414 | 5/1995 | Ast et al. | 342/174 |
| 5,428,712 | 6/1995 | Elad et al. | 395/51 |
| 5,495,256 | 2/1996 | Piper | 342/195 |
| 5,515,378 | 5/1996 | Roy, III et al. | 455/450 |
| 5,542,101 | 7/1996 | Pal | 455/65 |

FOREIGN PATENT DOCUMENTS

| | | | |
|---|---|---|---|
| 142293 B1 | 12/1990 | European Pat. Off. | G01S 7/28 |
| 595247 A1 | 5/1994 | European Pat. Off. | H01Q 3/26 |
| WO9534997A | 12/1995 | Sweden . | |
| 22766998 | 11/1993 | United Kingdom . | |
| WO9409568A | 4/1994 | WIPO . | |

OTHER PUBLICATIONS

Zetterberg et al. "The Spectrum Efficiency of a Basestation Antenna Array System for Spatially Selective Transmission" 1994 IEEE.

Zetterberg et al., "The Spectrum Efficiency of a Base Station Antenna Array System for Spatially Selective Transmission", Aug. 1995, IEEE Transactions on Vehicular Technology, vol. 44, No. 3.

North et al., "Multichannel Adaptive Equalization for Improved Performance in LOS Digital Radio", 1994 IEEE MILCOM. Conference Record (CAT. No. 94CH34009), Proceedings of MILCOM '1994, Fort Monmouth, NJ, USA, Oct. 2–5, 1994, pp. 117–122, vol. 1, XP002065786.

*Primary Examiner*—Wellington Chin
*Assistant Examiner*—Philip J. Sobutka
*Attorney, Agent, or Firm*—Ritter, Van Pelt & Yi LLP

[57] ABSTRACT

An adaptive reception and transmission technique according to one embodiment of the invention offers the advantages of adaptive reception transmission using feedback without the associated mobile radio complexity increase and information capacity penalty. The technique has been developed to exploit structured variation which occurs in the multipath fading present in the wireless antenna array channel. Thus, multipath propagation effects are explicitly accounted for in the problem approach. The technique is blind in that the antenna beam is formed in the absence of explicit knowledge of the array geometry, and without the necessity of array calibration or mobile feedback. The basic approach is to estimate the optimum receive and transmit antenna beam pattern based on certain statistical properties of the received antenna array signals. The optimum receive and transmit beam pattern is found by solving an optimization equation. The adaptive transceiver system is suitable for use in conjunction with either a diplexed transmit/receive antenna array, or with separate transmit and receive arrays.

13 Claims, 6 Drawing Sheets

WIRELESS COMMUNICATION NETWORK USING TIME-VARYING VECTOR CHANNEL EQUALIZATION FOR ADAPTIVE SPATIAL EQUALIZATION

RELATED APPLICATIONS

This application is a continuation-in-part of U.S. Ser. No. 08/491,044, filed on Jun. 16, 1995, pending, which is a continuation-in-part of U.S. Ser. No. 08/394,652 filed on Feb. 22, 1995, abandoned, both incorporated herein by reference.

This application claims priority to U.S. Provisional application Ser. No. 60/005,647 filed on Oct. 19, 1995, incorporated herein by reference.

FIELD

The present invention relates to a wireless communication network that uses time-varying vector channel equalization for adaptive spatial equalization. In particular, the invention is used in a wireless communication network to improve the quality of communication.

BACKGROUND

Within wireless mobile communication systems, procedures for compensating for multipath effects are desirable. Unlike "line-of-sight" radio links, a number of signal transmission paths typically comprise each wireless communication channel, hence the term "multipath." An increase in primary path communication energy is desired with an attendant reduction in the interference energy radiated to mobile users over other non-primary paths. Often this increase in primary path communication energy is achieved through generation of spatially selective, directive transmission beam patterns.

Some systems employ directive antennas at base station sites to increase the signal level received from and transmitted to each mobile user relative. Other systems use an antenna array that is used to form beams to increase the signal level received from and transmitted to each mobile user. In the systems with an antenna array, often called a phased array, weights are used to account for various angles that the beam will provide. Problems occur when severe multipath signals are created by a plurality of obstructions such as buildings and mountains. When severe multipath occurs, many systems suffer severe quality degradation. Known systems cannot sufficiently account for severe multipath and the result is reduced quality communication.

FIG. 1 shows an illustrative representation of a wireless "multipath" communication channel between a base station 2 and a remote mobile user 4. The various signal transmission paths within each such multipath communication channel arise from reflection of the transmitted signal by dominant reflection surfaces 6, and by minor reflection surfaces 12, between the base station 2 and remote mobile user 4. Accordingly, techniques for improving signal reception in line-of-sight radio systems are often not directly applicable to multipath signal environments. For example, in line-of-sight system the "gain" of an antenna typically varies inversely to antenna beam width. However, if a given antenna beam width is made less than the angular region encompassing the various signal paths comprising a multipath communication channel, further reduction in the beam width may reduce the energy radiated along some of the angular paths. In turn, this may actually decrease the effective time average gain of the antenna.

These systems that perform blind transmission fail to employ a sufficient method for determining the received angle of the mobile station signal. As a result, known transmission beamforming techniques often use a trial and error approach that works barely satisfactorily, and does not always provide high quality communication.

RELATED ART

Within wireless mobile communication systems, three techniques have been developed for improving communication link performance using directive transmit antennas: (i) selection of a particular fixed beam from an available set of fixed beams, (ii) adaptive beam forming based on receive signal angle estimates, (iii) adaptive transmission based on feedback provided by the remote mobile user, and (iv) adaptive transmit beam forming based upon the instantaneous receive beam pattern. Each of these techniques is described briefly below.

In the first technique, one of several fixed base station antenna beam patterns is selected to provide a fixed beam steered in a particular direction. The fixed antenna beams are often of equal beam width, and are often uniformly offset in boresight angle so as to encompass all desired transmission angles. The antenna beam selected for transmission typically corresponds to the beam pattern through which the largest signal is received. The fixed beam approach offers the advantage of simple implementation, but provides no mechanism for reducing the signal interference power radiated to remote mobile users within the transmission beam of the base station. This arises because of the inability of the traditional fixed beam approach to sense the interference power delivered to undesired users.

The second approach involves "adapting" the beam pattern produced by a base station phase array in response to changing multipath conditions. In such beamforming antenna arrays, or "beamformers", the antenna beam pattern is generated so as to maximize signal energy transmitted to ("transmit beamforming"), and received from ("receive beamforming"), an intended recipient mobile user.

While the process of transmit beamforming to a fixed location over a line-of-sight radio channel may be performed with relative ease, the task of transmitting to a mobile user over a time-varying multipath communication channel is typically considerably more difficult. One adaptive transmit beamforming approach contemplates determining each angle of departure (AOD) at which energy is to be transmitted from the base station antenna array to a given remote mobile user. Each AOD corresponds to one of the signal paths of the multipath channel, and is determined by estimating each angle of arrival (AOA) at the base station of signal energy from the given user. A transmit beam pattern is then adaptively formed so as to maximize the radiation projected along each desired AOD (i.e, the AOD spectrum), while minimizing the radiation projected at all other angles. Several well known algorithms (e.g., MUSIC, ESPRIT, and WSF) may be used to estimate an AOA spectrum corresponding to a desired AOD spectrum.

Unfortunately, obtaining accurate estimates of the AOA spectrum for communications channels comprised of numerous multipath constituents has proven problematic. Resolving the AOA spectrum for multiple co-channel mobile units is further complicated if the average signal energy received at the base station from any of the mobile units is significantly less than the energy received from other mobile units. This is due to the fact that the components of the base station array response vector contributed by the lower-energy incident signals are comparatively small, thus making it difficult to ascertain the AOA spectrum corresponding to those mobile units. Moreover, near field obstructions proximate base station antenna arrays tend to corrupt the array calibration process, thereby decreasing the accuracy of the estimated AOA spectrum.

In the third technique mentioned above, feedback information is received at the base station from both the desired mobile user, and from mobile users to which it is desired to minimize transmission power. This feedback permits the base station to "learn" the "optimum" transmit beam pattern, i.e., the beam pattern which maximizes transmission to the desired mobile user and minimizes transmission to all other users. One disadvantage of the feedback approach is that the mobile radio needs to be significantly more complex than would otherwise be required. Moreover, the information carrying capacity of each radio channel is reduced as a consequence of the bandwidth allocated for transmission of antenna training signals and mobile user feedback information. The resultant capacity reduction may be significant when the remote mobile users move at a high average velocity, as is the case in most cellular telephone systems.

The fourth conventional technique for improving communication link performance involves use of an optimum receive beam pattern as the preferred transmission beam pattern. After calibrating for differences between the antenna array and electronics used in the transmitter and receiver, it is assumed that the instantaneous estimate of the nature of the receive channel is equivalent to that of the transmit channel. Unfortunately, multipath propagation and other transient channel phenomenon can substantially eliminate any significant equivalence between frequency-duplexed transmit and receive channels, or between time-division duplexed transmit and receive channels separated by a significant time interval. As a consequence, communication link performance fails to be improved.

SUMMARY

The present invention relates to a wireless communication network that uses time-varying vector channel equalization for adaptive spatial equalization. In particular, the invention is used in a wireless communication network to improve the quality of communication.

Accordingly, it is an object of the invention to provide an adaptive receive and transmit beamforming technique that improves communication quality by utilizing the received signal energy from remote users.

It is another object of the invention to provide an adaptive receive and transmit beamforming technique which accounts for the presence of multipath fading inherent in the communication channel.

It is yet another object of the invention that the beamforming technique be independent of antenna array geometry, array calibration, or of explicit feedback control signals from remote users.

It is another object of the invention to provide adaptive receive and transmit beam forming that improves signal quality received by a desired user and while simultaneously reducing interference energy received by other undesired users so as to, within a cellular communication network, improve communication traffic capacity, and/or to increase base station coverage area, and/or to improve call quality.

An adaptive reception and transmission technique according to one embodiment of the invention offers the advantages of adaptive reception transmission using feedback without the associated mobile radio complexity increase and information capacity penalty. The technique has been developed to exploit structured variation which occurs in the multipath fading present in the wireless antenna array channel. Thus, multipath propagation effects are explicitly accounted for in the problem approach. The technique is blind in that the antenna beam is formed in the absence of explicit knowledge of the array geometry, and without the necessity of array calibration or mobile feedback. The basic approach is to estimate the optimum receive and transmit antenna beam pattern based on certain statistical properties of the received antenna array signals. The optimum receive and transmit beam pattern is found by solving an optimization equation. The adaptive transceiver system is suitable for use in conjunction with either a diplexed transmit/receive antenna array, or with separate transmit and receive arrays.

Advantages of the invention include reduced interference and improved communication quality.

BRIEF DESCRIPTION OF THE FIGURES

Additional advantages of the invention will become apparent upon reading the following detailed description and upon reference to the drawings, in which.

DETAILED DESCRIPTION

The present invention relates to a wireless communication network that uses time-varying vector channel equalization for adaptive spatial equalization. In particular, the invention is used in a wireless communication network to improve the quality of communication.

The exemplary embodiments are described herein with reference to specific configurations and protocols. Those skilled in the art will appreciate that various changes and modifications can be made to the exemplary embodiments while remaining within the scope of the present invention.

The problem we consider is blind adaptive spatial equalization with a multiple antenna base station array for the purpose of increasing reverse link spectral efficiency (Erlangs/Hz/base station) or range by canceling interference and enhancing the desired signal over noise. In blind equalization, the equalizer weight vector adaptation relies on the structure of the transmitted signal rather than a known training signal. While these techniques may be applied at the portable unit, this present embodiments focus on spatial equalization at the base station.

The communication channel formed between a portable wireless user and a wireless base station varies with time. When the portable moves with high velocity, the time variation in the channel can become severe. Over the past decade, a large body of work has been devoted to blind spatial equalization in time invariant channels. However, less work has been reported for large Doppler-spread conditions. For certain communication signals, including narrow-band FM, the known existing equalizer algorithms fail to converge in rapidly fading environments. This occurs because the channel changes significantly over the time interval required to determine the next equalizer weight vector update.

In most conventional adaptive algorithms, the signal quality criteria is minimum mean squared error (MMSE). We will show that this criteria may not be the best choice in rapidly fading channels. We will also show that the signal to interference plus noise ratio (SINR) criteria can be more robust in rapidly fading channels. With this information and motivation, an algorithm is developed which adaptively optimizes an interesting variation of the conventional SINR criteria.

The exemplary equalizer decomposes the received vector signal into a desired signal subspace and an interference plus noise subspace. In order to accurately estimate these two subspaces, we exploit the inherent time correlation structure that exists in the fading channel to obtain instantaneous blind estimates of the desired channel. Supplement 1 is provided for additional information and includes additional background and introduction material.

I. Overview of Beamforming Network

Figure 2A:
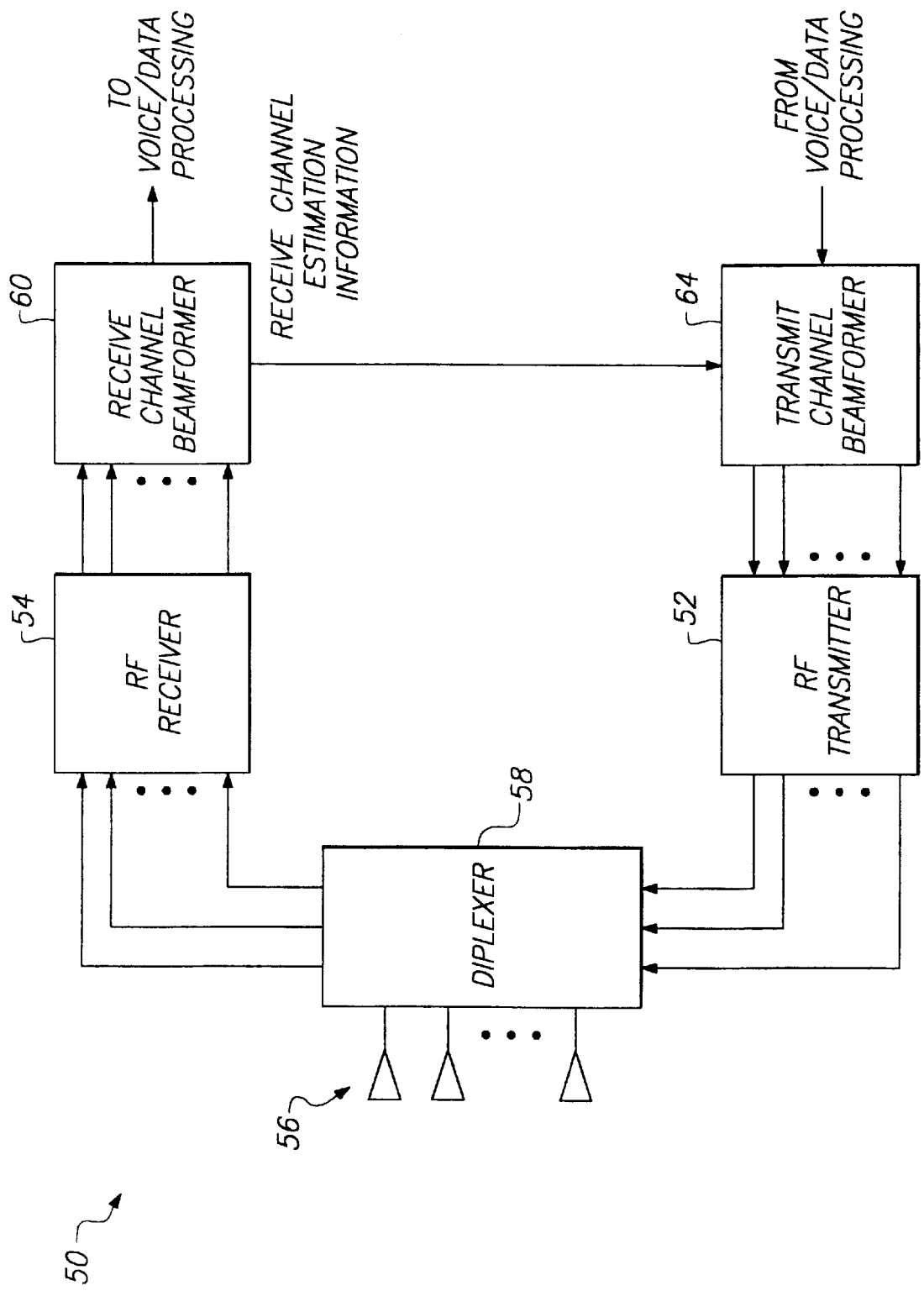
FIG. 2A is a block diagram of the physical implementation of a beamforming network configured to perform adaptive beam forming in accordance with the present invention.

Turning now to FIG. 2A, a block diagram is shown of the physical organization of a beamforming network 50 configured to perform adaptive beam forming in accordance with the present invention. In an exemplary embodiment the beamforming network 50 is disposed within a base station of a cellular communications network, in which is included a transceiver comprised of a radio frequency (RF) transmitter 52 and an RF receiver 54.

In the embodiment of FIG. 2A, a base station antenna array 56 serves to produce independent transmit and receive antenna beams for facilitating communication with one or more mobile units (not shown). The term "receive channel vector" is employed to indicate that each antenna element within the base station antenna array 56 will form a propagation channel to a given remote user. The composite array channel may be represented as a vector having elements corresponding to each individual antenna channel. As is described herein, statistical characterization of the receive channel vector provides information which may be used by the base station to determine an "optimal" transmit beam pattern, i.e., a transmit beam pattern which maximizes the average signal-to-interference power delivered to a given mobile user. This obviates the need for the mobile unit to provide feedback information to the base station relating to propagation characteristics of the transmit channel. This in turn simplifies implementation of the mobile unit, and preserves channel resources for data transmission by eliminating the need for "mobile unit feedback" relating channel characteristics to the base station.

As is indicated by FIG. 2A, a diplexer 58 can be employed to allow the antenna array 56 to be used for both transmit and receive operation by isolating the RF receiver 54 from the RF transmitter 52. A receive channel beamformer 60 cooperates with the RF receiver 54 to adaptively optimize the receive antenna beam in order to improve received signal quality. Similarly, a transmit channel beamformer 64 cooperates with the RF transmitter 52 to adapt the transmit antenna beam to optimize some characteristic of transmission quality. In an exemplary embodiment the transit channel beamformer 64 and receive channel beamformer 60 are each implemented as a special purpose digital signal processor (DSP).

Figure 2B:
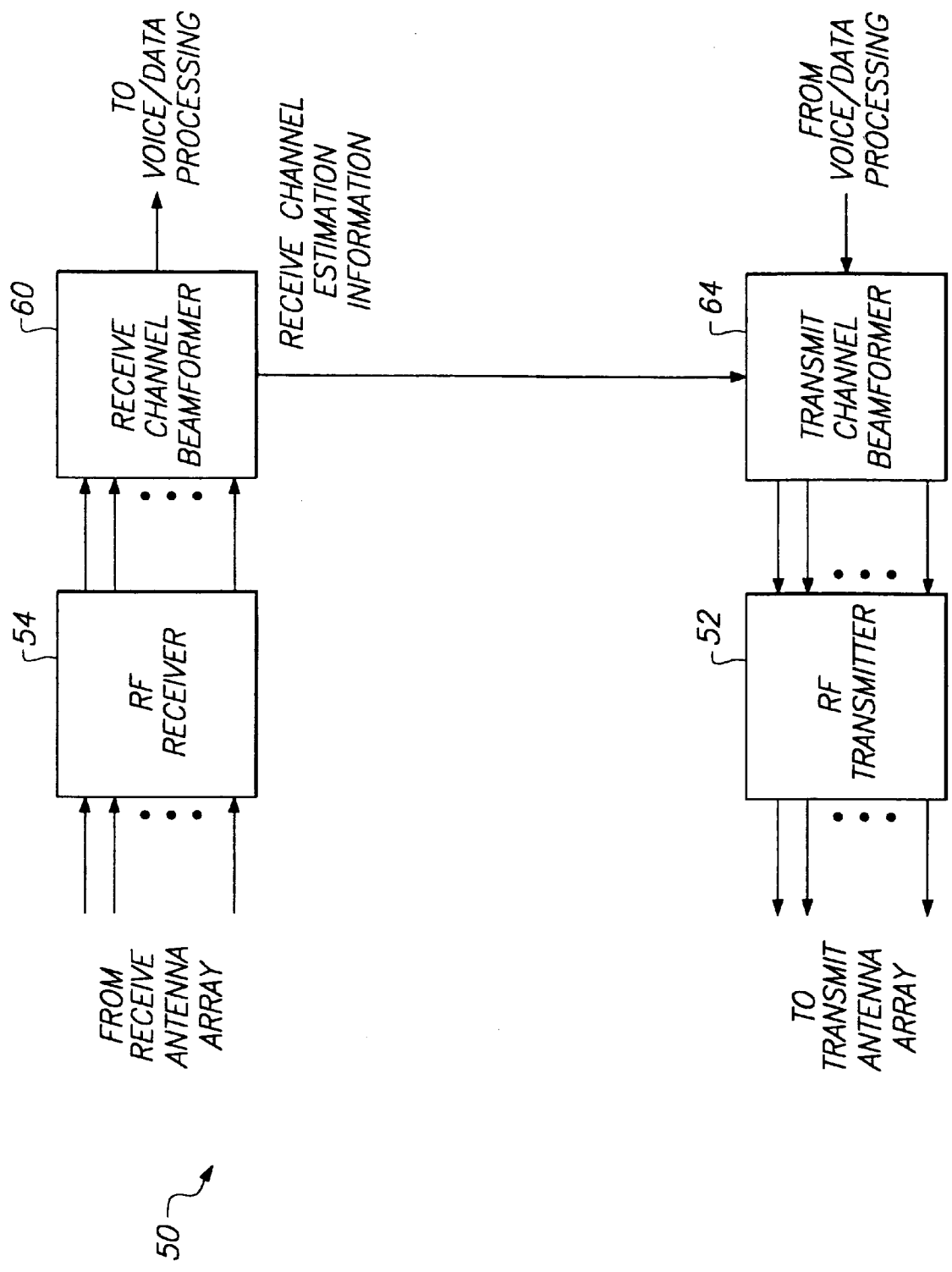
FIG. 2B is a block diagram of the physical implementation of a beamforming network in which a diplexor is employed to allow the antenna array to be used for both transmit and receive operation.

In another embodiment of the invention, distinct antenna arrays are used for signal reception and transmission as illustrated in FIG. 2B. In the embodiment of FIG. 2B, a diplexer is not required since a dedicated receive antenna array (not shown) is connected to the RF receiver 54, and a dedicated transmit antenna array (not shown) is connected to the RF transmitter 52. The receive and transmit antenna arrays are designed to provide identical radiation characteristics when operated at the receive and transmit frequencies, respectively. Accordingly, in many instances the physical geometries of the transmit and receive antenna arrays are simply physically scaled to account for the fractional difference in the receive and transmit RF wavelengths. The embodiment of FIG. 2B substantially eliminates the potential introduction of error arising from use of a single antenna array and diplexer.

Figure 3:
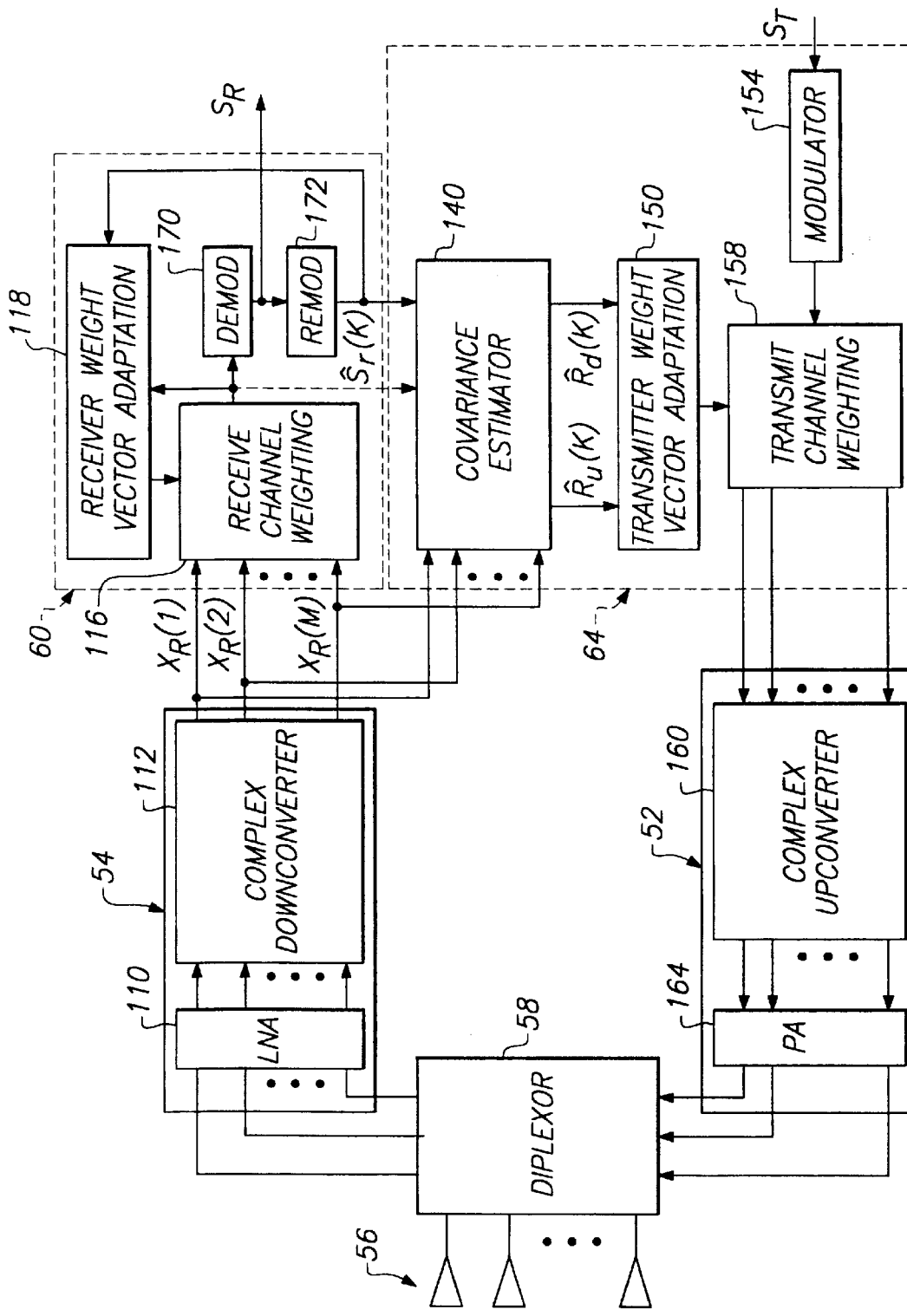
FIG. 3 is a functional block diagrammatic representation of a beamforming network of the present invention.

Turning now to FIG. 3, a functional block diagrammatic representation is provided of a beamforming network of the present invention. In FIG. 3, solid lines are used to represent functional elements and dashed lines are employed to identify the physical components of FIG. 2. The RF receiver 54 is functionally comprised of a low-noise amplifier (LNA) network 110, and a complex downconverter 112. The complex downconverter 112 is disposed to frequency downconvert the received RF signal energy after processing by the LNA network 110. The downconverted signal energy is then digitally sampled and provided to a receive channel weighting module 116 of the receive channel beamformer 60. The weights applied by the receive channel beamformer 60 to each of the M downconverted antenna element outputs $x_{R,m}(k)$, m=1 to M, of the complex frequency downconverter 112 are determined by a receiver weight vector adaptation module 118. In the exemplary embodiment the receiver weight vector adaptation module 118 determines a receive channel weight vector, $w_R$, which maximizes the signal quality received over the desired inbound frequency channel. The weight vector calculation is performed according to that described in Supplement 1.

In the embodiment of FIG. 3, a vector channel covariance estimator 140 within the transmit beamformer 64 operates to produce a statistical characterization of a receive channel vector using: (i) the outputs $x_{R,m}(k)$, m=1 to M, of the complex frequency downconverter 112, and (ii) an estimate of the desired signal $\hat{S}_r(k)$ generated in the receive channel beamformer 60. For present purposes the receive channel vector may be viewed as being representative of the multi-path communications channel from a mobile user (not shown in FIG. 3) to the antenna array 56. In an exemplary embodiment the statistical characterization carried out within the covariance estimator 140 yields an estimated receive channel covariance matrix used during the transmit beamforming process. Throughout the following description, scalar quantities are represented using lower case characters of standard type, vector quantities are represented using lower case characters of bold type, and matrix quantities are represented using upper case characters of bold type.

Within the transmit channel beamformer 64, an optimal transmit beam pattern weight vector is generated by a transmit channel weight vector adaptation module 150 based on the results of the statistical characterization of the receive channel vector. This weight vector, $w_T(t)$, optimizes a particular aspect (e.g., average desired signal to undesired interference ratio) of the signal energy within the transmission range of the base station array 56. In the exemplary embodiment, the optimal transmit beam pattern weight vector is generated using the estimated desired receive channel covariance matrix, $\acute{R}_d(k)$, and undesired interference covariance matrix, $\acute{R}_u(k)$, both of which are compiled within the covariance estimator 140.

As is indicated by FIG. 3, the signal information ($S_T$) to be transmitted to the desired mobile radio unit is used to modulate a digital baseband carrier within a modulator 154. The modulated signal is then applied to a transmit channel weighting module 158 disposed to weight, on the basis of the optimized transmit pattern weight vector, the input signals corresponding to each element of the antenna array 56. The weighted set of input signals produced by the weighting module 158 are then upconverted in frequency within a complex frequency upconverter 160 of the RF transmitter 52. The resultant frequency-upconverted signals are then amplified by a bank of power amplifiers 164, and provided to the antenna array 56 for transmission via diplexer 58.

In the exemplary embodiment an improved estimate of the received signal is obtained through utilization of a demodulator 170 and remodulator 172. The received signal is demodulated within demodulator 170 in order to recover the essential characteristics of the modulating signal. In the case of an analog FM signal, this involves recovery of the FM waveform. In the case of a digitally modulated signal (BPSK, FSK, QPSK, etc.), the demodulator 170 forms hard decisions as to the value of each digital symbol. The demodulated signal is then processed based upon some predefined characteristic of the signal and modulation pattern. For example, a demodulated analog FM signal could be lowpass filtered based upon a known signal information bandwidth as a means of obtaining an improved post-demodulation signal estimate. In the case of digital modulation, error correction could be implemented in order to remove bit errors, thus improving estimated signal quality. In addition, training signals (i.e., pilot tones, SAT tones, etc.) may optionally be employed in lieu of, or in conjunction with, the aforementioned "blind" techniques.

Again referring to FIG. 3, the processed demodulated signal is then used by demodulator 172 to remodulate an RF carrier, thereby producing an improved modulated signal estimate. The improved signal estimate is then used by the receiver weight vector adaptation block 118 and the covariance estimate 140. Other techniques, which do not rely upon such a demodulation/remodulation procedure, can be devised for obtaining a sufficiently accurate received signal estimate. FIG. 3 simply illustrates a particular exemplary embodiment incorporating a demodulator and remodulator.

In the present embodiment, the demodulator 170 and remodulator 172 or the receive channel beamformer 60 are operative to produce a received signal estimate $\acute{s}_r$. The quantity $\acute{S}_r$ is then employed by the covariance estimator 140 to estimate the covariance matrix of the receive channel. The receive channel beamformer 60 could of course be replaced by numerous alternative structures including, for example, multi-antenna sequence estimators, maximum likelihood receiver structures, multiple element decision feedback equalizers, or similar alternative described in Supplement 1. Any of these alternative structures could also be used to provide the quantity $\acute{s}_r$ for use in estimating the received channel covariance statistics.

II. Blind Beamforming Using Multipath Signals

As mentioned above, an initial step within the present invention involves characterizing a receive channel vector representative of the multipath communications channel from a mobile user to a base station antenna array 56. In one embodiment, this is accomplished as described in Supplement 1. This embodiment employs a five step approach:

1) estimate the present signal sequence by passing the equalizer output through a decision device;
2) estimate the present channel state with an optimal estimation filter;
3) estimate the received interference plus noise signal sequence and use this error signal to update the interference covariance estimate;
4) update the spatial equalizer weight vector given the estimated desired channel and interference covariance; and
5) repeat the process with new desired signal estimates.

III. Alternate Embodiments

Although the embodiments of the invention presented herein have been described in terms of optimization from a base station perspective, the teachings of the invention are equally applicable to optimum formation of the mobile unit antenna pattern. That is, the mobile unit antenna pattern is formed such that a desired level of power is transmitted to the one or more base stations with which the mobile unit is in communication, and so that transmission power is minimized to the other base stations within the communication network. Again, an initial step in this antenna pattern optimization procedure involves statistically characterizing the mobile unit receive channel vector. The results of this statistical characterization are then used to determine the beam pattern weight vector which maximizes a predetermined quality parameter (e.g., signal to noise ratio) of the signal received by the intended base station(s), while minimizing signal transmission to other base stations. At the mobile station, the transmit antenna beam pattern is then generated in accordance with the transmit beam pattern weight vector.

Accordingly, in the following claims the term "central communications station" is intended to refer to either the base station or mobile unit configured to generate an optimized antenna beam pattern in accordance with the invention. When a base station comprises the central communications station, the mobile unit(s) in communication therewith are referred to as "remote communications station (s)". Conversely, when a mobile unit comprises the central communications station, the receiving base station(s) are identified as remote communications station(s).

While the present invention has been described with reference to a few specific embodiments, the description is illustrative of the invention and is not to be construed as limiting the invention. Various modifications may occur to those skilled in the art while remaining within the true spirit and scope of the invention as defined by the appended claims.

SUPPLEMENT 1

New blind adaptive spatial equalization techniques are proposed for severe multipath fading with co-channel interference. In rapidly fading environments, equalizer performance suffers with existing algorithms because the desired and interference channels change significantly over the update time interval. It is shown that for fast fading channels, conventional squared error equalizer cost functions can yield poor results. A new algorithm is proposed based on a variation of the SINR cost function coupled with optimal time varying channel estimation to improve signal tracking. In simulations, the algorithm achieves theoretically optimum time varying equalizer performance in extreme interference channels with narrow band FM signals and high velocity portables. These results are contrary to the widespread belief that high performance blind adaptive array processing is not possible for AMPS with severe combinations of Doppler spread, angle spread, and interference power.

1. Introduction

The problem we consider is blind adaptive spatial equalization with a multiple antenna base station array for the purpose of increasing reverse link spectral efficiency (Erlangs/Hz/base station) by canceling interference and enhancing the desired signal over noise. In blind equalization, the equalizer weight vector adaptation relies on the structure of the transmitted signal rather than a known training signal. While these techniques may be applied at the portable unit, this paper focuses on spatial equalization at the base station receiver.

The communication channel formed between a portable wireless user and a base station varies with time. When the portable moves with high velocity, the time variation in the channel can become severe. Over the past decade, a large body of work has been devoted to blind spatial equalization in time invariant channels. However, less work has been reported for large Doppler-spread conditions. For certain communication signals, including narrow-band FM, the known existing equalizer algorithms fail to converge in rapidly fading environments. This occurs because the channel changes significantly over the time interval required to determine the next equalizer weight vector update.

In most conventional adaptive algorithms, the signal quality criteria is minimum mean squared error (MMSE). We will show that this criteria may not be the best choice in rapidly fading channels. We will also show that the signal to interference plus noise ratio (SINR) criteria can be more robust in rapidly fading channels. With this motivation, an algorithm is developed which adaptively optimizes an interesting variation of the conventional SINR criteria. The proposed equalizer decomposes the received vector signal into a desired signal subspace and an interference plus noise subspace. In order to accurately estimate these two subspaces, we exploit the inherent time correlation structure that exists in the fading channel to obtain instantaneous blind estimates of the desired channel.

The multiple antenna wireless channel model is briefly reviewed in Section 2. The spatial equalization problem is developed and a solution is proposed in Section 3. Simulation results demonstrating the performance of the adaptive spatial equalizer with multiple co-channel narrow-band analog FM signals in a high Doppler spread, high angle spread fading environment are presented in Section 4. Conclusions are offered in Section 5.

2. Channel Models

Figure 1:
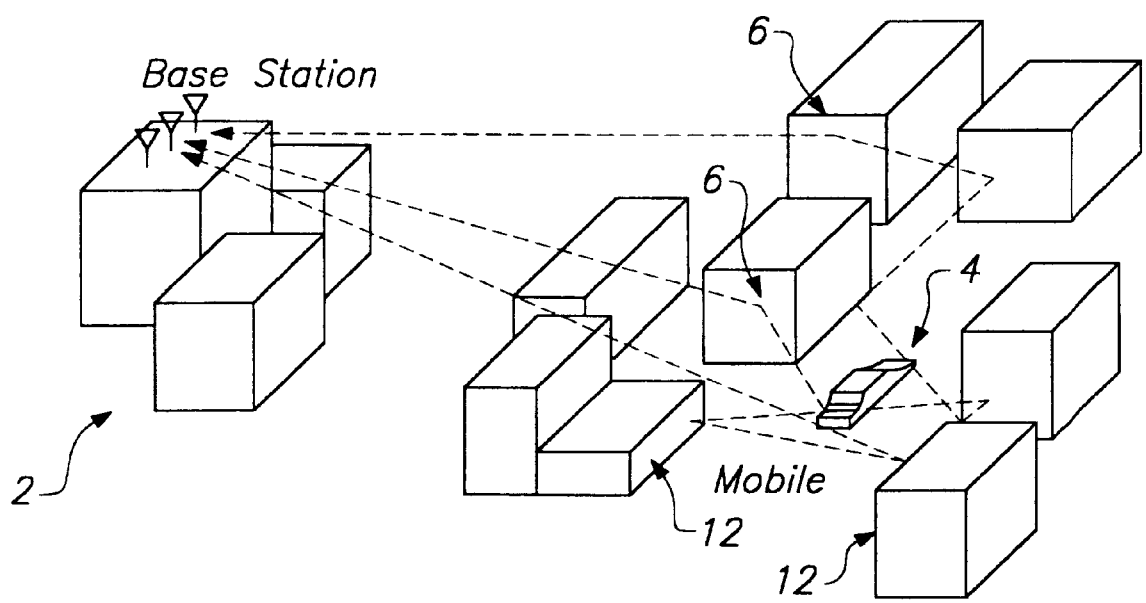
FIG. 1 is an illustrative representation of a multipath propagation channel between a base station and a remote user station.

The wireless communication channel is characterized by scattering and reflecting bodies which cause severe multipath. This is illustrated in FIG. 1. The channel is also time-varying when the receiver is in motion. The time-variation is characterized by rapid amplitude fluctuations and therefore is called a fading channel. These short-term complex amplitude variations are often well modeled by a multiplicative Gaussian random process. The channel also exhibits long-term variations which are due to shadowing by large physical features. This variation is much less structured and is sometimes well modeled as a log-normal multiplicative random variable.

Let $s_o(t)$ be the complex analytic baseband representation of the transmitted signal. If the remote transmitter has a single antenna and the wireless base station receiver has multiple antennas, then the direction of arrival of the $1^{th}$ path form the receiver (given by $\theta_{0,1}$) is of importance. The baseband vector output of the base station receiver dues to the $1^{th}$ propagation path is $$x_1(t) = a(\theta_{0,1})\beta_{0,1}(t)s_0(t) \tag{1}$$

where $a(\theta_{0,1})$ denotes the base station array response to the path arriving at the angle $\theta_{0,1}$. The composite complex-valued propagation path strength $\beta_{0,1}(t)$ is given by $$B_{0,l}(t) = \frac{1}{d_0^{\frac{n}{2}}} \alpha_{0,l}(t) \cdot \sqrt{T_{0,1}} \tag{2}$$

where $\alpha_{0,1}(t)$ is the complex fast fading parameter, $\Gamma_1$ is the shadow fading loss factor, $d_0$ is the distance from the mobile to the base station and $\eta_0$ is the path power-loss exponent. In Equation (1) an inherent assumption is that each propagation path amplitude is frequency invariant over the bandwidth of the signal and that the relative time delay between different arriving paths is small compared to the inverse signal bandwidth. Below, it is further assumed that the array response $a(\theta_{0,1})$ is invariant over the signal bandwidth. This set of conditions is commonly referred to as the narrow band assumption.

The received time-domain signal vector is the sum of all dominant reflector paths and the additive receiver noise $n(t)$ $$x(t) = \sum_{l=1}^{L} x_l(t) + n(t) = \sum_{l=1}^{L} a(\theta_{0,l})\beta_{0,l}(t)s_0(t) + n(t) \tag{3}$$

Clearly from the above model, the time-varying response of the continuous-time desired portable channel is $$h_0(t) = \sum_{l=1}^{L} a(\theta_{0,l})\beta_{0,l}(t) \tag{4}$$

The channel given in Equation (3) is sampled at a rate of T seconds. The output samples can be rewritten as, $$x_k = h_{0,k}s_{0,k} + n_k \tag{5}$$

with the discrete time channel response given by $$h_{0,k} = \sum_{l=1}^{L} a(\theta_{0,l})\beta_{0,l,k}$$

In the presence of multiple user co-channel interference, we have the received signal vector $$x_k = h_{0,k} s_{0,k} + \sum_{j=1}^{P} h_{j,k} s_{j,k} + n_k \quad (6)$$

When portables move at high velocities, giving rise to large Doppler frequency shifts, the channel vector complex M-space direction and magnitude become rapidly varying functions of time. The propagation environment determines the exact nature of the vector variation. The central path angle and relative spread in path angles (angle spread) for each channel determines the Eigenvectors and Eigenvalues of the time averaged vector subspace spanned by the channel. The Doppler spread determines the rate of time variation within the channel subspace.

3. Spatial Channel Equalization

The techniques proposed in this paper do not consider conventional antenna concepts such as beam width, gain and side lobe rejection. Instead, the antenna array is viewed from a statistical signal processing perspective. Each antenna array output represents a phase and amplitude coherent sensor which contains a weighted sum of the desired signal, the undesired signals, and noise. By applying an appropriate complex weight to each sensor signal and then summing the outputs, it is possible to cancel undesired interference and enhance the desired signal above the noise. The sensor weights are described by an equalizer weight vector w. If the weight vector is adapted in real time in an optimal manner, it is possible to achieve performance that is far superior to fixed beam systems. To implement a fully adaptive array, a bank of phase and amplitude coherent digital RF receivers is required. Recent technology advances in wide band digital RF converter technology make such systems not only feasible, but also economical. An Adaptive spatial equalizer conceptual diagram is illustrated in FIG. 3.

3.1. Algorithm Cost Function

In order to adapt the spatial equalizer weight vector, it is necessary to define an equalizer signal quality optimization function. Here, we consider two possible cost functions, MMSE and maximum S1NR. We will show that for slowly varying channels, these cost functions are equivalent to within a scalar constant. We will also show that for rapidly varying channels, with a fixed equalizer weight applied to a finite block of received data, the two cost functions result in very different solutions and the maximum SINR criteria is often a more sensible choice. First, the slowly varying channel case is considered. Then the case where the channels fade rapidly with respect to the equalizer adaption rate is discussed.

Under the slowly varying channel condition, if perfect knowledge were available for the instantaneous desired channel, the instantaneous co-channel interference channels, the desired signal variance, the interference signal variances, and the noise variance, the well known "instantaneous" MMSE spatial equalizer solution is $$W_{MSE,k} \doteq \arg\min_{w} E\{|w^* x_k - s_{0,k}|^2\} = \sigma_{s_0}^2 R_{x,k}^{-1} h_{0,k} \quad (7)$$

where $R_{x,k}$ is the "instantaneous covariance" matrix for the received signal vector defined by $$R_{x,k} \approx E\{x_k x^*_k\} = \sigma_{s_0}^2 h_{0,k} h^*_{0,k} + R_{u,k} \quad (8)$$

and $R_{u,k}$ is the instantaneous interference plus noise covariance matrix defined by $$R_{u,k} \doteq \sum_{j=1}^{P} \sigma_{2,j}^2 h_{j,k} h^*_{j,k} + \sigma_n^2 I \quad (9)$$

The above expressions are derived under the assumption that the desired signal, all interfering signals, and the noise are uncorrelated.

Given the same apriori knowledge, the maximum SINR problem is $$w_{SNR,k} \doteq \arg\max_{w} \frac{E\{|w^* h_{0,k} s_{0,k}|^2\}}{E\left\{\left|w^* \left[\sum_{j=1}^{P} h_{j,k} s_{j,k} + n_k\right]\right|^2\right\}} \quad (10)$$

The solution for $W_{SNR,k}$ is easily derived as the generalized eigenvector associated with the maximum generalized eigenvalue of the matrix pencil $$[h_{0,k} h^*_{0,k}, R_{u,k}]$$

which is equivalent to the solution $$W_{SNR,k} = R^{-1}_{u,k} h_{0,k} \quad (11)$$

since $$h_{0,k} h^*_{0,k}$$

is obviously rank 1. Using the matrix inversion lemma, we can prove that the MMSE solution to Equation (7) is equivalent to the maximum SINR solution to Equation (11) to within a scalar constant given by $$w_{MSE,k} = \left( \frac{1}{h^*_{0,k} R^{-1}_{u,k} h_{0,k} + \frac{1}{\sigma_{s_0}^2}} \right) w_{SNR,k} \quad (12)$$

So, we conclude that with perfect instantaneous desired and undesired channel knowledge the MMSE and SINR cost functions lead to nearly identical solutions.

In rapidly time varying channel setting, perfect instantaneous knowledge of the channels is not available. The channels often change appreciably over the adaptation interval of the equalizer algorithm. In such cases, there can be a substantial difference between the MMSE and SINR adaption criteria. Consider an adaptive spatial equalization algorithm based on an optimal MMSE solution similar to Equation (7), but the algorithm employs a sliding window of length N samples for each weight vector. Numerous proposed schemes apply a sliding window. The sliding window MMSE problem statement may be written as $$w^{(N)}_{MSE,k} \doteq \arg\min_{w} E\{\|w^* X_k - s_{0,k}\|_2^2\} \quad (13)$$

where the received signal vector sequence $$X_k[x_k^* \cdots ^* X_{k-N+1}]$$

and the transmitted desired signal sequence $$x_{0,k} = [s_{0,k} \cdots s_{0,k-N+1}]$$

Again assuming perfect knowledge of the channels, we can show that the solution is $$W_{MSE,k}^{(N)} = \sigma_{so}^2 \left[ \sum_{j=0}^{P} \sigma_{sj}^2 \langle h_{j,k} h_{j,k}^* \rangle_N + \sigma_n^2 I \right]^{-1} \langle h_{0,k} \rangle_N \quad (14)$$

where $$\langle (\cdot) \rangle_N = \frac{1}{N} \sum_{n=-\infty}^{k} (\cdot)_n$$

is the N-sample averaging operator. We can compare this finite block length solution to the ideal instantaneous solution to Equation (7) by re-writing Equation (14) as $$W_{MSE,k}^{(N)} = \sigma_{so}^2 [R_{s,k} + \Delta R_k]^{-1} [h_{0,k} + \Delta h_k] \quad (15)$$

where the covariance error term is $$\Delta R_k = \frac{1}{N} \sum_{n=k-N+1}^{k-1} \sum_{j=0}^{P} \sigma_{sj}^2 h_{j,n} h_{j,n}^* - \frac{N-1}{N} \sum_{j=0}^{P} \sigma_{sj}^2 h_{j,k} h_{j,k}^* \quad (16)$$

and the channel error term is $$\Delta h_k = \frac{1}{N} \sum_{n=k-N+1}^{k-1} h_{0,n} - \frac{N-1}{N} h_{0,k} \quad (17)$$

For a time varying channel, as N increases, the error terms in the finite block length solution increase. The effect of the covariance error $\Delta R_k$ is to add false components to the interference subspace in the equalizer solution. The effect of the channel error $\Delta h_k$ is additive. The combination of these effects is highly non-linear. Thus, it is not clear that applying the MMSE criteria to finite length time blocks with rapidly fading channels will result in desirable performance. As a simple example, given the zero mean channel model from the previous section, it can be shown that $$\lim_{N \to \infty} w_{MSE,k}^{(N)} = 0 \quad (18)$$

which is clearly a useless solution. This motivates a search for cost functions which are more robust in time varying channels.

In contrast to the above, applying the SINR criteria to a block of received data always results in a useful equalizer solution, even in the limit. Carrying through a similar development for the SINR equalizer, we have $$w_{NR,k}^{(N)} \doteq \underset{w}{\arg \max} \frac{E\{\|w^*[h_{0,k} s_{0,k} \ldots h_{0,k-N+1} s_{0,k-N+1}]\|_2^2\}}{E\left\{ \left\| w^* \left( \sum_{j=1}^{P} [h_{j,k} s_{j,k} \ldots h_{j,k-N+1} s_{j,k-N+1}] + [n_k \ldots n_{k-N+1}] \right) \right\| \right\}} \quad (19)$$

The solution for $$w_{SNR,k}^{(N)}$$

is the generalized eigenvector associated with the maximum generalized eigenvalue of the matrix pencil $$\left[ \langle h_{0,k} h_{0,k}^* \rangle_N; \sum_{j=1}^{P} \sigma_{sj}^2 \langle h_{j,k} h_{j,k}^* \rangle_N + \sigma_n^2 I \right]$$

This solution has a precise meaning: "Given N received samples and one equalizer weight vector setting, maximize the ratio of the average received signal energy divided by the average noise plus interference energy." The theoretically achievable SINR will decrease as N increases because the interference and desired signal covariance matrices will become more well conditioned thus reducing the maximum eigenvalue of the matrix pencil. However, this degradation is graceful and is easily Equalizer Solution (a) $\quad \left[ \sum_{j=1}^{P} \sigma_{sj}^2 h_{j,k} h_{j,k}^* + \sigma_n^2 I \right]^{-1} h_{0,k}$ (b) $\quad \left[ \sum_{j=1}^{P} \sigma_{sj}^2 \langle h_{j,k} h_{j,k}^* \rangle_N + \sigma_n^2 I \right]^{-1} h_{0,k}$ (c) $\quad v_{\max}\left( \langle h_{0,k} h_{0,k}^* \rangle_{N'} \left[ \sum_{j=1}^{P} \sigma_{sj}^2 \langle h_{j,k} h_{j,k}^* \rangle_N + \sigma_n^2 I \right] \right)$ analyzed. This will be illustrated in Section 4.

It is also possible to use convenient combinations of instantaneous and average channel information to form variations on the SINR criteria. Three variations of the SINR equalizer are presented in Table 3.1. As we will see in the next section, it is also sometimes advantageous to replace the averaging operation $$\langle (\cdot)k \rangle_N$$

with the exponentially weighted averaging operator given by $$\langle (\cdot)k \rangle_\lambda \doteq \sum_{n=-\infty}^{k} \lambda^{k-n} (\cdot)_n, \quad 0 < \lambda < 1 \quad (20)$$

3.2 Algorithm Description

The highest potential equalizer performance is obtained with the SINR cost function based on the instantaneous desired channel and the instantaneous undesired interference subspace. A second solution is possible which is based on a short term time average interference subspace description and the instantaneous desired channel. The performance for this equalizer is lower than the first since the interference matrix includes subspace components from past interference channel states. The relative performance decrease is dependent on the angle of arrival spread and the product of the time window length and the Doppler frequency. A third equalizer solution involves subspace averaging for both the desired and undesired channels with still lower performance.

From the above, it would seem obvious to choose the instantaneous criteria. However, in time varying interference dominated channels, blind equalization algorithms which rely on signal property restoral are subject to false signal tracking. False tracking occurs when the instantaneous desired channel is in a deep fade and the algorithm converges to a stronger interference signal. With a time average interference covariance solution, the algorithm becomes less susceptible to false tracking as the effective interference subspace averaging window is increased. Thus, a trade-off exists between achieving the optimum instantaneous SINR performance and robust signal tracking. This motivates us to choose an SINR equalizer solution which has the form $$\hat{w}_k = \frac{[\langle \hat{R}_{u,k} \rangle_\lambda]^{-1} \hat{h}_k}{\hat{h}_k^*[\langle \hat{R}_{u,k} \rangle_\lambda]^{-1} \hat{h}_k} \quad (21)$$

where (*) implies an estimated value. We note that the trade-off between instantaneous SINR performance and tracking robustness can easily be adjusted by varying the forgetting factor $\lambda$. Increasing $\lambda$ results in a decrease in the rate of false tracking occurrences, and a decrease in performance as compared to the ideal instantaneous solution. Several techniques are available to detect and recover from false tracking events, so signal quality is maintained as long as the occurrence rate is low. The proposed equalization strategy is divided into five steps which are 1. Estimate the present signal sequence by passing the equalizer output through a decision device. [Equations (22) and (23)].
2. Estimate the present channel state with an optimal estimation filter. [Equations (25) and (27)].
3. Estimate the received interference plus noise signal sequence. Use this error signal to update the interference covariance estimate. {Equations (30) and (31)].
4. Update the spatial equalizer weight vector given the estimated desired channel and interference covariance. [Equation (21)].
5. Repeat the process with new desired signal estimates.

This adaptation procedure is represented by the block diagram shown in FIG. 3. Each of the algorithm steps are described below.

Using the present equalizer setting, a short block of received data is equalized $$\acute{s}_{0,k} = \hat{w}^*_k X_k - [\acute{s}_k^* * * \acute{s}_{k-N+1}] \quad (22)$$

The equalizer output is then passed through a non-linear detection function d(*) which restores some known property of the transmitted portable signal. In the case of an FM signal set, the nonlinear function can simply force the signal modulus to a constant value, or a more sophisticated combination modulus forcing and phase filtering function has been proposed. In the case of finite alphabet digital signals, the nonlinear function is a symbol waveform detector. The output of the detection function is the estimated signal sequence $$\acute{s}_{0,k} = d(\acute{s}_{0,k}) \quad (23)$$

In order to accurately determine the interference subspace and the optimal weight vector, it is critical to have an accurate estimate of the desired channel. The channel exhibits highly structured time autocorrelation behavior for each antenna element. This structured variation should be exploited to improve our ability to identify and track the desired channel. The channel is estimated in two steps. First, a "measurement" of the reverse channel $h_{o,k}$ is obtained by solving $$\hat{h}_{0,k} = \arg \min_h \|\hat{h} \acute{s}_{0,k} - X_k\|_F^2 \quad (24)$$

Here, the channel is assumed time invariant over the data block. The data block must be a very small fraction of the inverse Doppler frequency to maintain this assumption. Assuming the noise plus interference is Gaussian, the solution to Equation (24) is the deterministic maximum likelihood estimate $$\hat{h}_{0,k} = X_k \acute{s}^{-1}_{0,k} \quad (25)$$

The channel measurements defined by Equation (25), provide a true channel plus noise measurement model since $$X_k \acute{s}^{-1}_{0,k} h_{0,k} + N_k \acute{s}^{-1}_{0,k} = h_{0,k} + u_k \quad (26)$$

where $N_\kappa = [n_\kappa * * * n_{\kappa-N+1}]$ and $u_\kappa$ is the equivalent channel measurement noise term $$N_k \acute{s}^{-1}_{0,k}$$

The final channel estimate is a weighted sum of the present and past channel measurements $$\hat{h}k = \sum_{n=0}^{N-1} f_n \hat{h}_{k-n} \quad (27)$$

with the FIR filter vector f given by $$f = \arg \min_f E\{\|\hat{h}_k - h_{0,k}\|_2^2\} \quad (28)$$

The solution to Equation (28) is a Wiener filter given by $$f = [E\{\beta_k \beta^*_k\} + E\{u_k u^*_k\}]^{-1} E\{\beta_k \beta^*_k\} \quad (29)$$

where $$\beta_k - [\beta_k * * * \beta_{k-N_{H,2}+1}]^T$$

is a vector of scalar fading variables representing the time varying complex amplitude of one channel vector entry in $h_\kappa$ and $\mu_\kappa =$ $$[u_k * * * uk - N_{2+1}]^T$$

is the corresponding time varying measurement noise vector for each entry in $u_\kappa$. The filter solution to Equation (29) can be based on ensemble average statistics or based on worst case sample path behavior. The ensemble average covariance function for $\beta_\kappa$ is:

$$\sigma^2_\beta J_o(w_d t)$$

The noise covariance is determined by the nature of the additive receiver noise and the short term cross-correlation and autocorrelation behavior of the interference signals.

The solution for the channel estimation filter is also dependent on two $$SNR\left(\frac{\sigma_\beta^2}{\sigma_w^2}\right)$$

variables, the maximum Doppler shift and the channel measurement. In the interest of complexity reduction, the filter design can be based on the maximum expected Doppler shift and the minimum expected SNR. Performance is enhanced if the Doppler and SNR are estimated and the filter coefficients are adapted either by resolving Equation (29) or by choosing the estimation filter from a fixed set of pre-computed possibilities.

To estimate the undesired interference subspace, the undesired signal sequence is estimated $$\hat{X}_{u,k}=X_k-\hat{h}_k\hat{s}_{0,k} \tag{30}$$

The interference covariance estimate is then updated $$(\hat{R}_{u,k})_\lambda=\lambda\hat{R}_{u,k-1}+\hat{X}_{u,k}\hat{X}^*_{u,k} \tag{31}$$

The weight vector is now given by Equation (21). The sample index $\tau$ is incremented by N and the next iteration is initiated.

It should be noted that many variations on this basic algorithm are possible. Several implementations involving sample by sample recursions have been evaluation. The FIR channel estimation filter can be replaced by an observer based filter with various state-space model possibilities. The fundamental contributions are the blind SINR adaption criteria, the subspace decomposition and the use of correlated desired channel behavior to improve estimation accuracy for the desired channel and the interference subspace.

4. Simulations

Simulations have been conducted to test the spatial equalizer approach discussed in the previous section. The signals are narrow-band FM with the following parameters:

$f_o$=1 GHZ (RF center frequency)

$f_D$=±103 Hz (v=70 mph)

$B_{voice}$=4 KHz (voice waveform bandwidth)

$\Delta f_{voice}$=±12 KHz (peak voice FM excursion)

$f_{SAT}$=6 KHz (SAT tone offset)

$\Delta f_{SAT}$=±12 KHz (peak SAT tone FM excursion)

Here, we present one example simulation scenario in which the base station antenna is a six element linear array with inter-element spacing of $\lambda/2$. There are three transmitted mobile signals, each with equal average strength. Each signal arrives from four different paths. Each of the four paths for each signal are spread over a 30° range. Each path for each signal has independent fading generated by 10 randomly located local scatterers. The central path angles of arrival for the three signals are 40°, 20° and −70°. Complex Gaussian band limited noise is added at the output of each antenna element. The ratio of the time averaged received signal power to average additive noise power is 20 dB per element. As the instantaneous channel fades, the instantaneous signal to additive noise power at each element varies above and below 20 dB.

The blind spatial equalization algorithm described in the previous section was used to recover estimates for each of the three FM signals. The detection function d(*) is the complex sign. The data block length NT is 200 $\mu$S with a corresponding adaptation rate of 5 KHz. This is sufficient to support the assumption that the channel is constant over each block. The blind algorithm restarts when false signal tracking events are detected. False tracking detection can be implemented by several methods including monitoring SAT tone quality.

Figure 4:
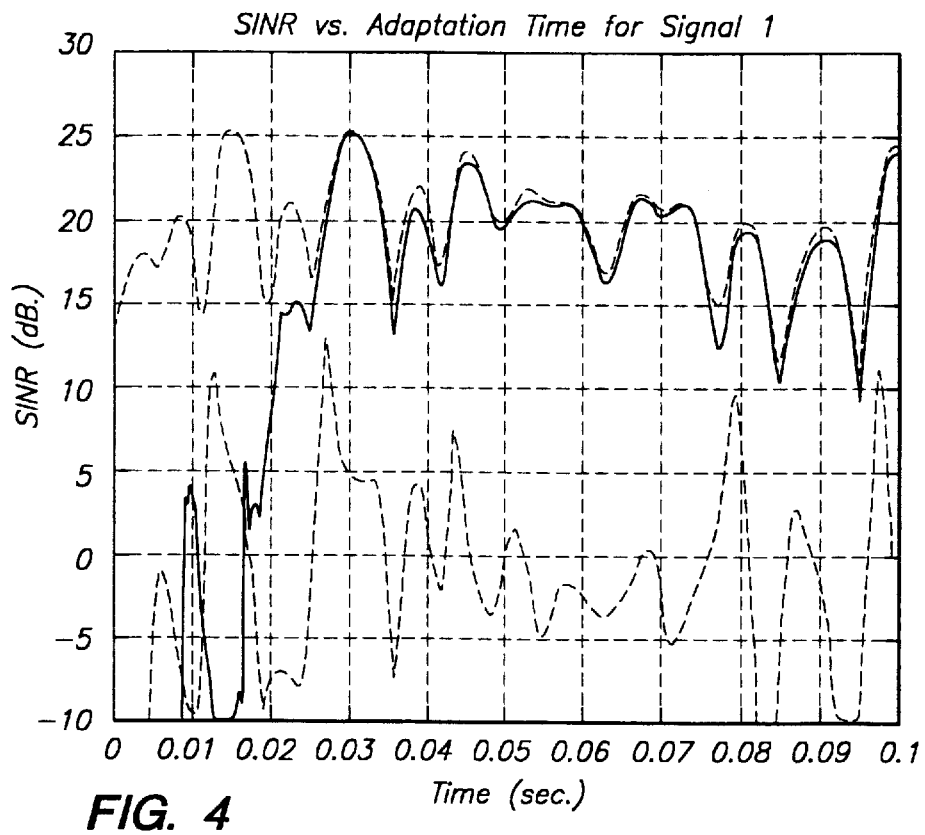
FIG. 4 is a graph depicting estimated signal SINR versus adaptation time for signal 1.
Figure 5:
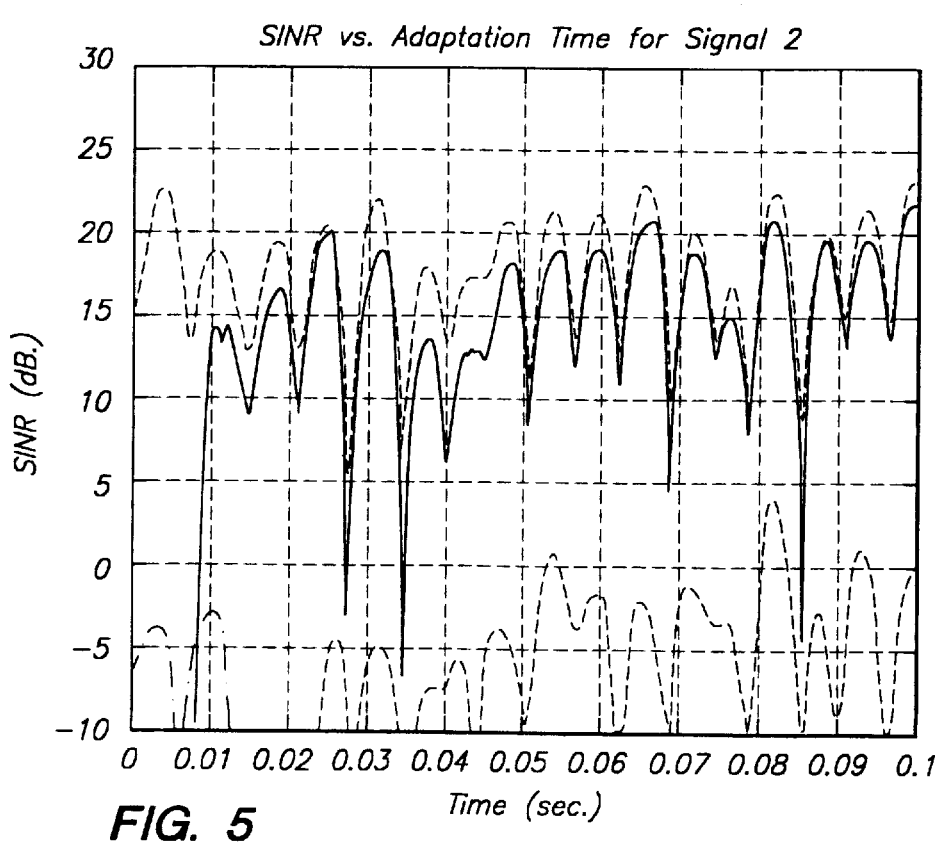
FIG. 5 is a graph depicting estimated signal SINR versus adaptation time for signal 2.
Figure 6:
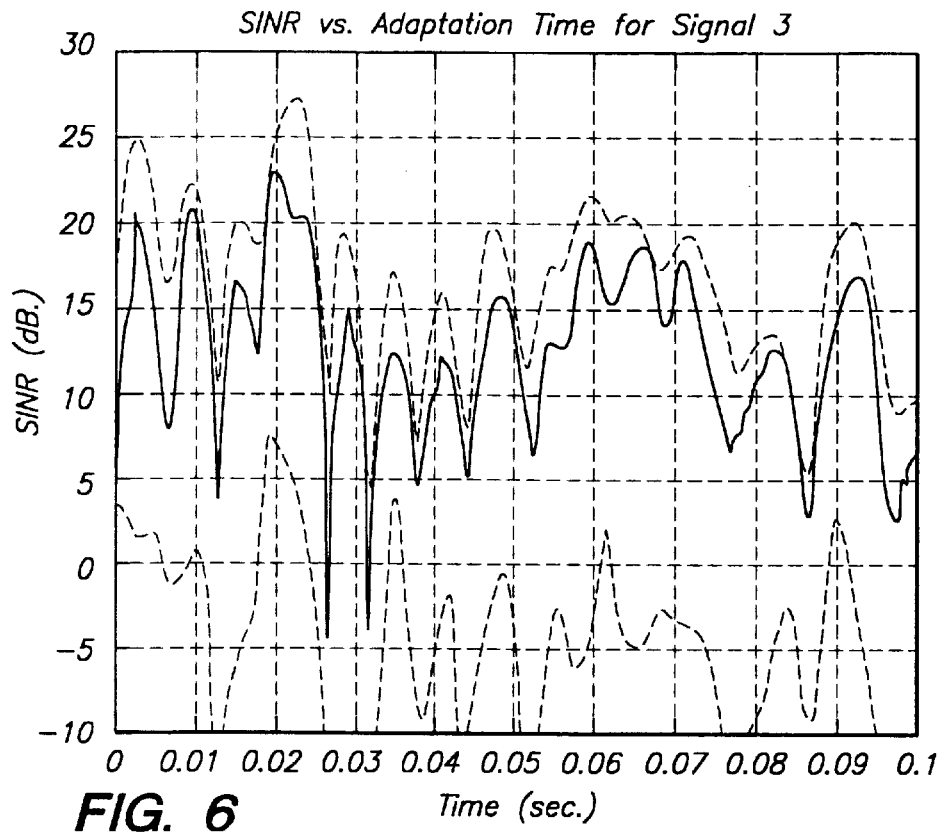
FIG. 6 is a graph depicting estimated signal SINR versus adaptation time for signal 3.
Figure 7:
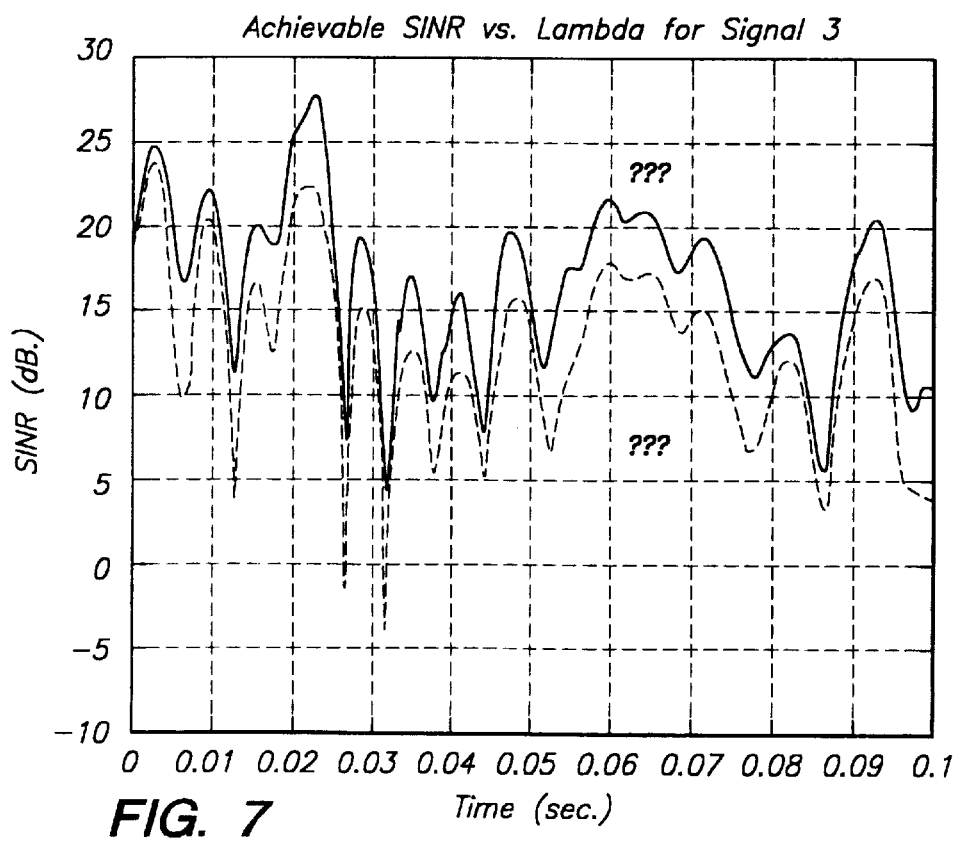
FIG. 7 is a graph showing theoretical performance bounds for variable A.

The instantaneous SINR for the recovered signal waveforms $\tilde{s}_{0,k}$ at the output of the spatial equalizer for each of the three signal estimates is plotted (solid) along with the corresponding optimum theoretical instantaneous SINR performance (dash) in FIGS. 4 through 6. The instantaneous SINR for one omni-directional antenna element (dash-dot) is also plotted to provide a reference for SINR improvement. Optimum performance is determined by the maximum eigenvalue of the instantaneous matrix pencil $$[h_{0,k}h^*_{0,k}; R_{u,k}]$$

All three simulation runs were performed on the same data set with the same initial weight vector setting. The only difference is the signal selected for tracking. Conventional CM algorithms were also applied to the simulated data set. None of the CM algorithms were found to converge to any of the three signals.

The one second time average estimated signal SINR for signals 1 through 3 is 18.8 dB, 17.2 dB and 15.7 dB. The average estimated signal SINR loss with respect to the optimal instantaneous solution is 0.7 dB, 1.9 dB, and 3.8 dB respectively. This is accounted for by the performance loss associated with the subspace forgetting factor $\lambda$. FIG. 4 illustrates the theoretical limits for instantaneous SINR performance sacrifice for signal 3 due to increasing the interference subspace forgetting factor $\lambda$. In FIG. 4, the optimal instantaneous SINR solution (solid) is plotted along with the maximum eigenvalue of the pencil $$[h_{0,k}h^*_{0,k}, [R_{u,k}]\lambda]$$

(dash) with $\lambda$=0.9999 which approaches infinite averaging. The theoretical performance penalty, averaged over one second, between the optimal instantaneous interference covariance solution and the infinite average interference covariance solution is 4.6 dB for the signal 3 example. These simulation results suggest that the proposed algorithm achieves optimal theoretical performance when the theoretical penalty due to interference subspace averaging is taken into account.

CONCLUSIONS

A new approach for blind adaptive spatial equalization in rapidly fading channels has been developed. The algorithm performs well in an extreme narrow band FM communication environment with high Doppler spread, high angle spread, and strong multiple co-channel interferers. We believe that these are the first reported results for a blind spatial equalizer which performs well on AMPS type signals in a high velocity portable multipath setting. The approach involves two fundamental results:

1. For certain communication signals in rapidly fading channel settings, a modified version of the SINR adaptive equalizer cost function is superior to conventional squared error cost functions.

2. Optimal estimation techniques can be applied to obtain accurate channel estimates in the presence of noise and interference. High quality channel estimates are crucial to obtaining an accurate estimate of the interference subspace used to determine the SINR equalizer solution.

Extensions of our approach have been developed for multiple antenna delay-spread digital FIR communication channels. These time varying space-time equalizer results will be reported in a future paper.

What is claimed is:

1. A base station receive processor for communicating with a remote station comprising:

a plurality of inputs receiving inbound information signals from said remote station via a plurality of antennas and a plurality of receivers; and a signal processor that 1) accepts said inbound information signals as input, 2) estimates transmitted data based on said inbound information signals, 3) estimates a desired channel based on said estimated transmitted data, 4) identifies an undesired component of a receive channel statistical characterization based on a difference between said inbound information signals and signals resulting from applying said estimated desired channel to said estimated transmitted data, and 5) applies a weighting to said plurality of inputs based on said estimated desired channel and said undesired component of said statistical characterization.

2. The receive processor of claim 1 wherein said estimated transmitted data represents data received from exactly one remote station.

3. The receive processor of claim 1 further comprising said plurality of receivers.

4. The receive processor of claim 1 further comprising said plurality of antennas.

5. The receive processor of claim 1 wherein said signal processor comprises:

one or more time-varying channel estimation filters to apply to estimate said desired channel.

6. The receive processor of claim 1 wherein said statistical characterization comprises a covariance matrix.

7. The receive processor of claim 1 wherein said undesired component comprises a subspace of said covariance matrix.

8. The receive processor of claim 7 wherein said weighting is determined based on a signal quality criterion.

9. The receive processor of claim 8 wherein said signal quality criterion is an SINR criterion based on instantaneous values of said estimated desired channel and said undesired component of said statistical characterization.

10. The receive processor of claim 8 wherein said signal quality criterion is an SINR criterion based on a time average of said estimated desired channel and an instantaneous value of said undesired component of said statistical characterization.

11. The receive processor of claim 8 wherein said signal quality criterion is a combination of an instantaneous SINR criterion and an average SINR criterion.

12. A communications system comprising:

a base station;

exactly one remote unit transmitting to said base station at a frequency;

said base station comprising:

a plurality of inputs receiving inbound information signals from said remote station via a plurality of antennas and a plurality of receivers; and a signal processor that 1) accepts said inbound information signals as input, 2) estimates transmitted data based on said inbound information signals, 3) estimates a desired channel based on said estimated transmitted data, 4) identifies an undesired component of a receive channel statistical characterization based on a difference between said inbound information signals and signals resulting from applying said estimated desired channel to said estimated transmitted data, and 5) applies a weighting to said plurality of inputs based on said estimated desired channel and said undesired component of said statistical characterization.

13. In a wireless communication system comprising a base station and a remote unit transmitting to said base station, a method of operating said base station comprising:

estimating a signal sequence transmitted by said remote unit by applying output of an equalizer to a decision device;

estimating a channel state for a channel from said remote unit to said base station based on said estimated signal sequence and knowledge of signal transmitted by said remote unit;

estimating a received interference plus noise sequence based on said estimated signal sequence and said knowledge of signal transmitted by said remote unit;

updating an interference covariance matrix based on said received interference plus noise sequence; and updating a weight vector of said equalizer based on said estimated channel state and said interference covariance matrix.

* * * * *